United States Patent
Towfiq et al.

(10) Patent No.: US 8,427,510 B1
(45) Date of Patent: Apr. 23, 2013

(54) DIGITIZING VENUE MAPS

(75) Inventors: Mark Towfiq, Palo Alto, CA (US); Alan Wada, Mountain View, CA (US); Yacin Bahi, Los Altos, CA (US)

(73) Assignee: Nextag, Inc., San Mateo, CA (US)

( * ) Notice: Subject to any disclaimer, the term of this patent is extended or adjusted under 35 U.S.C. 154(b) by 1129 days.

(21) Appl. No.: 12/349,461

(22) Filed: Jan. 6, 2009

(51) Int. Cl.
*G09G 5/00* (2006.01)
*G06Q 10/00* (2006.01)

(52) U.S. Cl.
USPC .................................. 345/654; 345/689; 705/5

(58) Field of Classification Search .................. None
See application file for complete search history.

(56) References Cited

U.S. PATENT DOCUMENTS

| | | | |
|---|---|---|---|
| 2007/0250705 A1* | 10/2007 | Smith et al. | 713/157 |
| 2008/0232638 A1* | 9/2008 | Tompkins et al. | 382/100 |
| 2008/0281644 A1* | 11/2008 | Payne | 705/5 |
| 2012/0123813 A1* | 5/2012 | Sunshine et al. | 705/5 |

* cited by examiner

*Primary Examiner* — Ke Xiao
*Assistant Examiner* — Donna Ricks
(74) *Attorney, Agent, or Firm* — Fenwick & West LLP

(57) ABSTRACT

A system and methods provide for the automatic and computer-assisted generation of vectorized venue maps for event venues, including the outline, location, and label of each section in the venue, each row within each section, and in some cases, each individual seats in each row.

20 Claims, 10 Drawing Sheets

DIGITIZING VENUE MAPS

BACKGROUND OF THE INVENTION

1. Field of the Invention

This invention pertains in general to digitizing venue maps, and in particular to generating a venue map and venue information used to support an online, interactive event ticket buying system.

2. Description of the Related Art

On-line event ticket purchasing systems allow buyers to purchase tickets for various events. These systems typically allow buyers to search for events, view a list of matching events, choose an event of interest, view available tickets for that event, and then purchase tickets. Ticket buyers typically want to know exactly where they're going to sit in the venue. Seats with a better view or seats closer to the field or performer are generally more desirable, and usually cost more than seats further away. Buyers usually want to find the best seats within their budget (usually selecting from a wide price range of tickets). Accordingly, some systems have a static venue map, typically a bitmap image, that the buyer can refer to when selecting tickets. Some systems have more complex maps, which may be interactive and may display limited ticket information directly on the map.

A key problem to support complex, interactive maps is developing detailed data about the venue, including the specific locations of sections, rows and seats and encoding that information into an format from which an interactive map can be generated. The information can be developed manually, an expensive and time-consuming process. For example, consider the manual effort needed to manual encode the information for a venue with 100,000 or more seats; such a process would be necessary for dozens of venues all around the country.

BRIEF SUMMARY OF THE INVENTION

A system and methods provide for the automatic and computer-assisted generation of vectorized venue maps for event venues, including the outline, location, and label of each section in the venue, each row within each section, and in some cases, each individual seats in each row.

Generally, in one embodiment of a computer assisted method for generating an interactive digitized map of a venue seating arrangement a data source file for a venue seating arrangement is received. The venue seating arrangement describes or represents the layout or sating arrangement of a venue. Typically a venue arrangement has a plurality of sections, each section has a location in the venue seating arrangement; each section further has one or more rows, with each row having at least one seat. The data source file may be received in a variety of different formats, including bitmap images, vector graphics files, spreadsheets, word processing documents, CAD files, database files, text files, or the like.

From the data source file, a vectorized venue map is generated. The vectorized venue map includes section outlines, each section outline corresponding to a section of the venue seating arrangement. This process may be done automatically, or with assistance of graphics edit and generation software tools and user inputs. In either case, the method provides for a workflow to assist and guide a user in this process. In addition, a section label is associated with each section outline in the venue map. Again, this may be done automatically from vector or structural data in the venue data source file, or with assisted of user inputs, according to the workflow. Within each section outline, lines indicating the location of the rows within the section are drawn and placed within the vectorized venue map, and a section label for each section outline and a row label for each row within a section outline is selected and associated with the appropriate section and row. Here too, this process may be done automatically from the vector or structural data, or with assisted user inputs. Finally, the vectorized venue map including the section outlines, section labels, row labels is stored in a vectorized representation, such as a vector graphics file, or a database, in a computer storage medium.

Further aspects of the invention include:
a. Automatic generation of section outlines from detailed graphic, structural or textual data about the rows in each section, the number of seats in each row, and the alignment of the rows within the section of an event venue;
b. Automatically determining the names of each venue section,
c. Automatic generation of the locations of each row (and in some cases, each seat) within each section, and,
d. Placement of venue map labels for each section, row and seat.
e. Storage of the foregoing information in a vectorized venue map in a vectorized representation in computer storage medium.

The invention has embodiments in computer systems, computer program products stored on computer storage media, as well as user interfaces generated by computer program products stored on computer storage media.

The features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

A system providing interactive ticket purchasing requires very detailed information about each venue. For example, the information needed includes the name, exact location and geometric bounds of each section within the venue, the name, exact location and configuration of each row within each section, and in some cases the exact location of each seat in each row. In some cases, the information also needs to include the location of venue amenities, such as bathrooms, food vendors, etc. Such an interactive map becomes be an integral part of the presentation of available tickets, the filtering of options based on the buyer's purchase criteria (e.g. a budget limit), and selection of tickets for purchase. For example, the system may indicate seats with icons placed on the venue map in corresponding locations where seats are available. The buyer may be able to zoom in and see additional detail, and may be able to choose tickets for purchase by clicking directly on the map. To provide this type of interactive map for an interactive ticket purchasing system, very detailed venue information is required. The present invention provides a computer system and associated computer assisted methods for digitizing detailed venue information.

Description of System Environment

Figure 1:
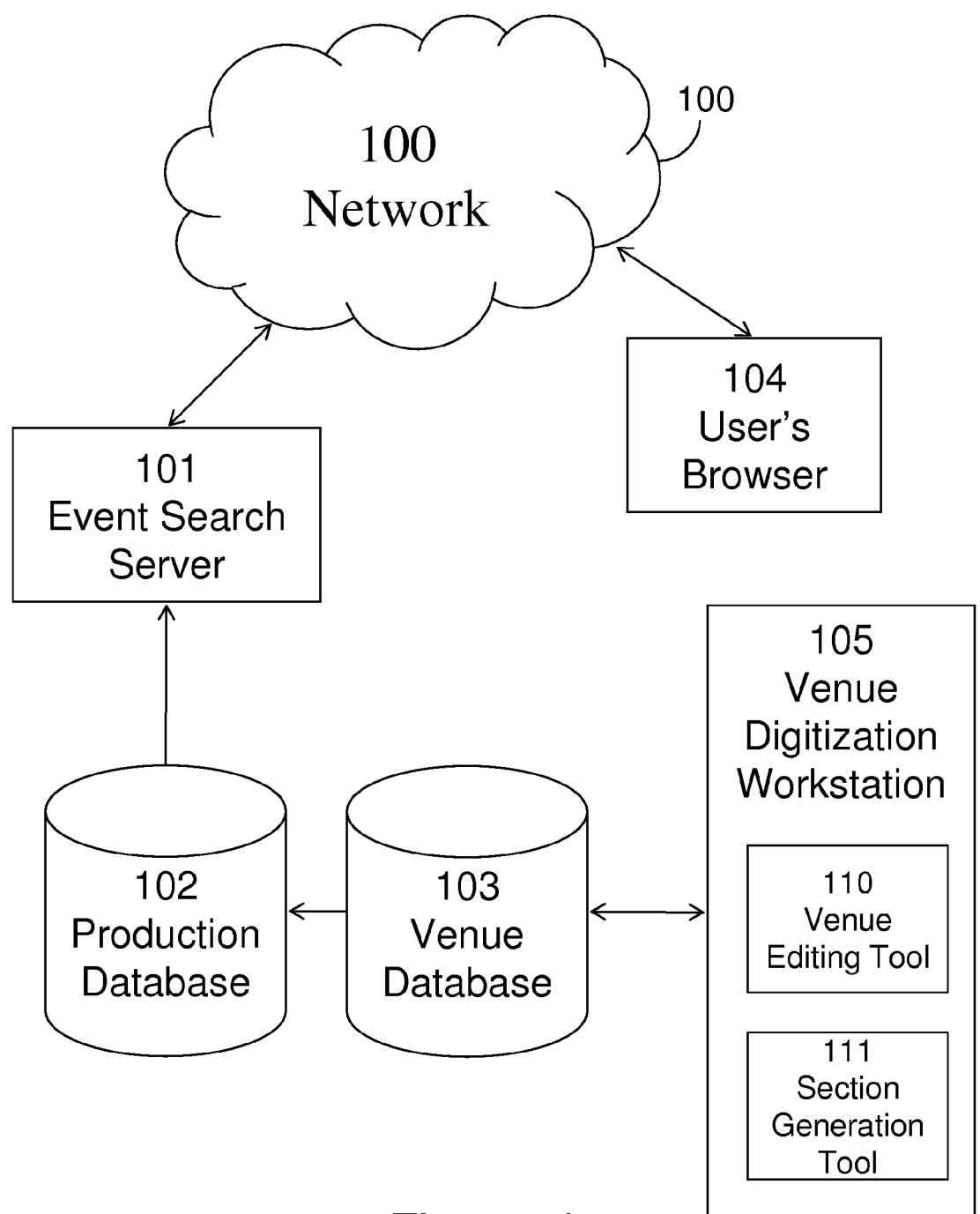
FIG. 1 is a high-level block diagram of the environment and software architecture for the system for digitizing venue maps.

FIG. 1 is a high-level block diagram illustrating a system for digitizing interactive venue maps. As used herein, the individual systems in FIG. 1 will be referred to as single systems, but a plurality of the same type of systems could be connected to the network 100.

Event search server 101 is a computer system configured to provide information about events, venues, and available tickets to on-line ticket buyers who access the server 101 via browsers 104 (only a single browser 104 is shown, but in practice the system is accessible by multiple users at once). For example, search server 101 may be a web server operated by a ticket broker or other ticket seller, and configured to provide information about tickets available for purchase, and receive and process the buyer's order and payment information. In another example, search server 101 may be a search engine providing information about tickets available from a number of different sellers. The search server 101 may also be hosted by an owner/operator of one or more event venues. A venue is any facility at which an event is being held, including but not limited to concert halls, stadiums, coliseums, convention centers, theaters, opera houses, cafés, nightclubs, dance halls, race tracks, and so forth. A venue typically, but not necessarily, has one or more arrangements of fixed seats or seating areas, or a combination of both fixed and open (general) seating.

The user's web browser 104 is the web browser and computer system used by a user shopping for tickets to purchase, which receives information from search server 101 for display. Usually, a user requests information from the search server 101 for the purposes of purchasing tickets; for this reason, the user is sometimes referred to as a "consumer", "purchaser" or "buyer".

Figure 2A:
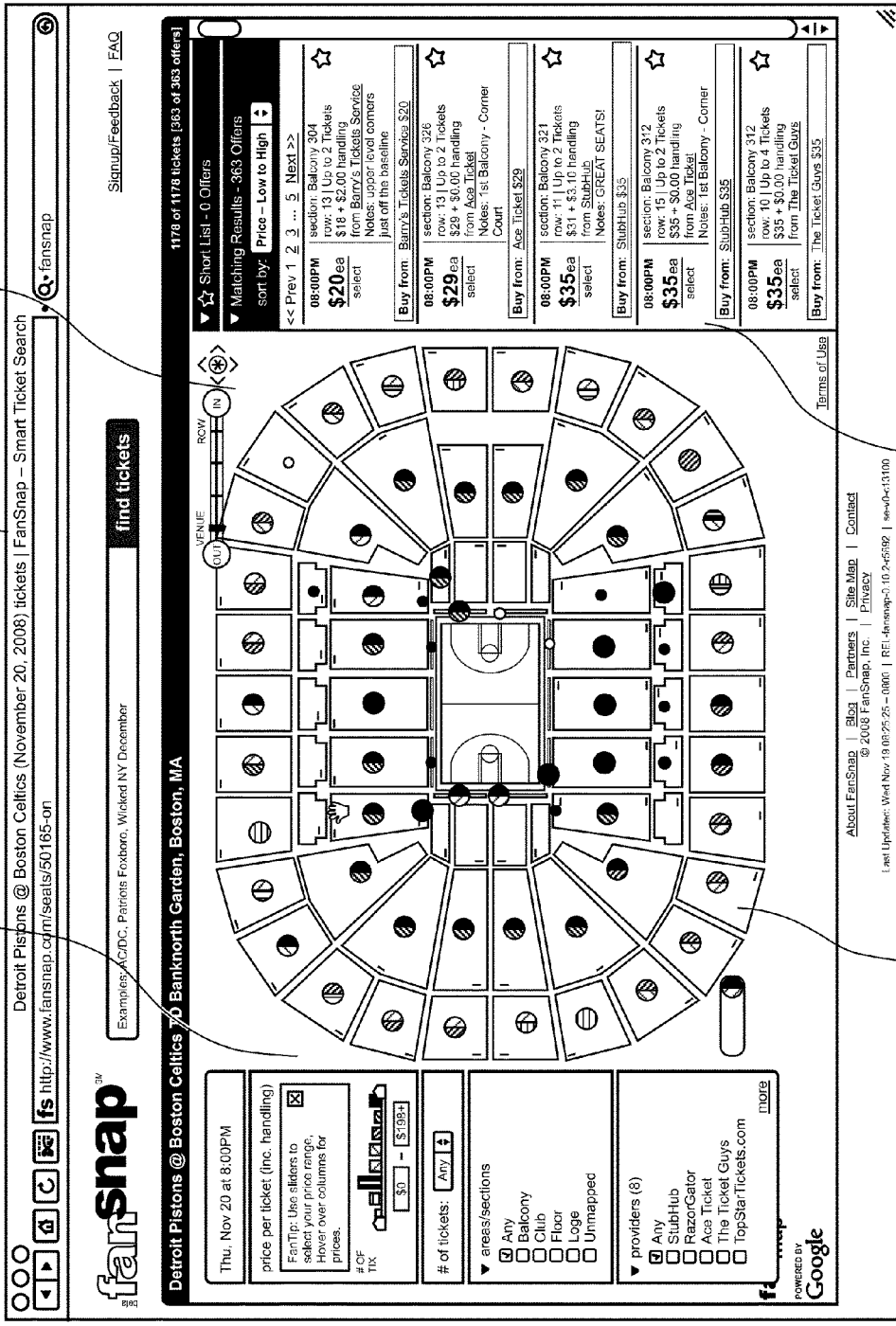
FIG. 2a is an example of an interactive venue map, displayed as a web page.
Figure 2B:
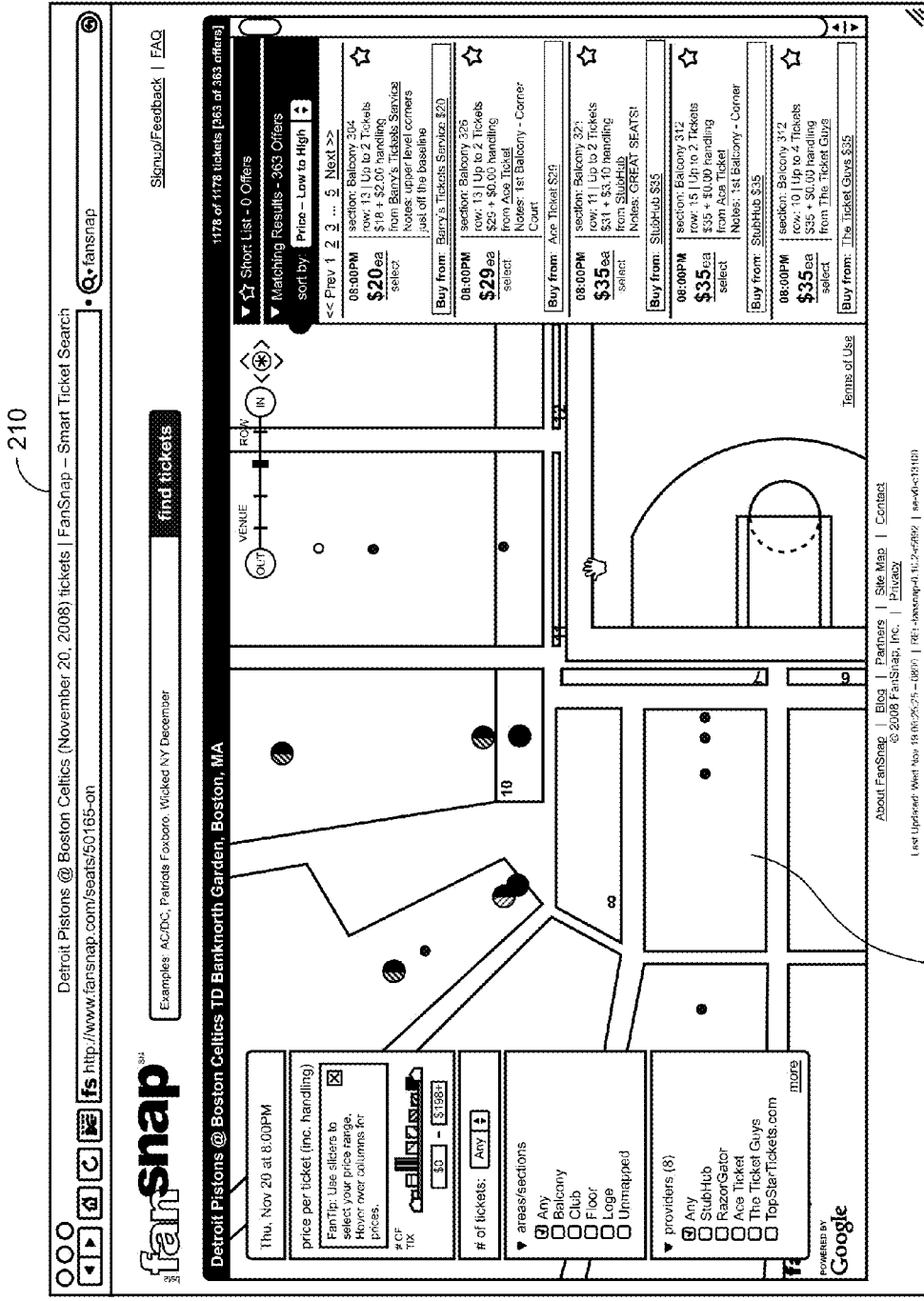
FIG. 2b is an example of the interactive venue map shown in FIG. 2a, with the venue map zoomed into show additional detail about the venue layout.

FIG. 2a illustrates an example web page 200 generated by search server 101 and presented to the buyer with web browser 104. This page shows an interactive venue map 201 and information 202 about available tickets for purchase. In this example, the buyer can manipulate the controls 204 on web page 200 to see additional information. For example, FIG. 2b shows web page 210 a venue map 211, which is a zoomed-in version of venue map 201, showing greater detail for one area of the venue.

In one embodiment, the user uses a browser 104 to communicate with event search server 101 and other systems on a network 100 in order to obtain event and ticket information. The user's computer system, for example, can be a personal computer executing a web browser such as APPLE SAFARI® that allows the user to retrieve and display content from web servers and other computer systems on network 100. Browser 104 may also be used from a network-capable device other than a computer system, such as a personal digital assistant (PDA), a cellular telephone, a pager, a television "set-top-box", an MP3 player, etc. The user's device or computer system may also be referred to as a "client" of event search server 101.

The network 100 represents the communication pathways between the user's web browser 104 and search server 101. In one embodiment, the network 100 is the Internet. The network 100 can also utilize dedicated or private communications links that are not necessarily part of the Internet. In one embodiment, the network 100 uses standard internetworking communications technologies and/or protocols. Thus, the network 100 can include links using technologies such as Ethernet, 802.11, integrated services digital network (ISDN), digital subscriber line (DSL), asynchronous transfer mode (ATM), etc. Similarly, the networking protocols used on the network 100 can include Transmission Control Protocol/Internet Protocol (TCP/IP), the Hypertext Transfer Protocol (HTTP), the Simple Mail Transfer Protocol (SMTP), the File Transfer Protocol (FTP), etc. The data exchanged over the network 100 can be represented using the technologies and/or formats including the Hypertext Markup Language (HTML), the Extensible Markup Language (XML), etc. In addition, all or some of the links can be encrypted using conventional encryption technologies, such as Secure Sockets Layer (SSL), Secure HTTP, and/or virtual private networks (VPNs). In another embodiment, the entities can use custom and/or dedicated data communications technologies, instead of, or in addition to, the ones described above.

The production database 102 contains the data to support buyers interacting with search server 101. For example, database 102 may include ticket information for multiple events. For each event, the database 102 stores venue name, city & state, the artist or team(s) performing, the type of event (e.g. "baseball game"), the starting date and time, and other event specific information. The venue information may include information about the venue layout, including the name, location, shape, and orientation of each section, row and seat. In addition, for each event, the database stores ticket information for tickets including for each ticket a price, section, row, seat number, and related information specific to each ticket. Database 102 operates as part of a database computer system, and may be implemented in any mechanism that stores structured records of data (e.g. a SQL database, a flat file with records, an object-oriented database, etc.), or unstructured records (e.g. flat files, etc.).

Venue database 103 contains the data about each venue that has been digitized, including the name, outline and specific location of each section, the name and location of each row within each section, and in some cases, the numbers (or names) and locations of each seat with each row. In one embodiment, the venue database 103 also stores the vectorized representation of the venue, where the polygon data for each section outline, row, and where applicable seat, is stored in a vector format. In some cases, the venue data may also include other information about the venue, such as the location of amenities (e.g. restrooms, concessions, handicapped access, etc.), special information about sections (e.g. handicapped seating, alcohol-free sections, food-service available, etc.), and special information about seats (e.g. under-cover, obstructed view, etc.) Database 103 operates as part of a database computer system, including a computer readable storage medium (e.g., hard disk), and may be implemented in any mechanism that stores structured records of data (e.g. a SQL database, a flat file with records, an object-oriented database, etc.), or unstructured records (e.g. flat files, etc.). In one embodiment, venue database 103 implements a version control system (e.g. CVS, Subversion, Git, etc.)

Venue digitization workstation 105 is used by the user doing the venue digitization work (the "digitization worker" or "worker") to perform any steps in the digitization process. In one embodiment, the automatic methods presented herein for venue digitization are executed on workstation 105 by software programming, as further described below. The software applications executed on workstation 105 include a venue-editing tool 110 and a section generation tool 111.

Venue editing tool 110 is an interactive graphical application allowing the worker to input, view, review, and modify venue information during the digitization process. In one embodiment, venue-editing tool 110 is a CAD editor or vector-graphics editor (e.g. AutoCAD, Inkscape, Adobe Illustrator, etc.). Such editor may be customized with add-ons or plug-ins. In another embodiment, venue-editing tool 110 is a customized software application, built for the purpose of venue digitization, and supports 2D, and preferably 3D, graphics files and operations, as well as vector graphics including SVG, and CAD file formats.

Section generation tool 111 is a software application that generates section outlines from detailed section data. In another embodiment, venue-editing tool 110 and section generation tool 111 are the same application.

Note that other information sources or systems could be connected to network 100. For example, other search servers 101 may be connected to network 100. As another example, other web sites accessed by user's browser 104 may be connected to network 100.

Description of Venue Digitization Methods

Figure 3:
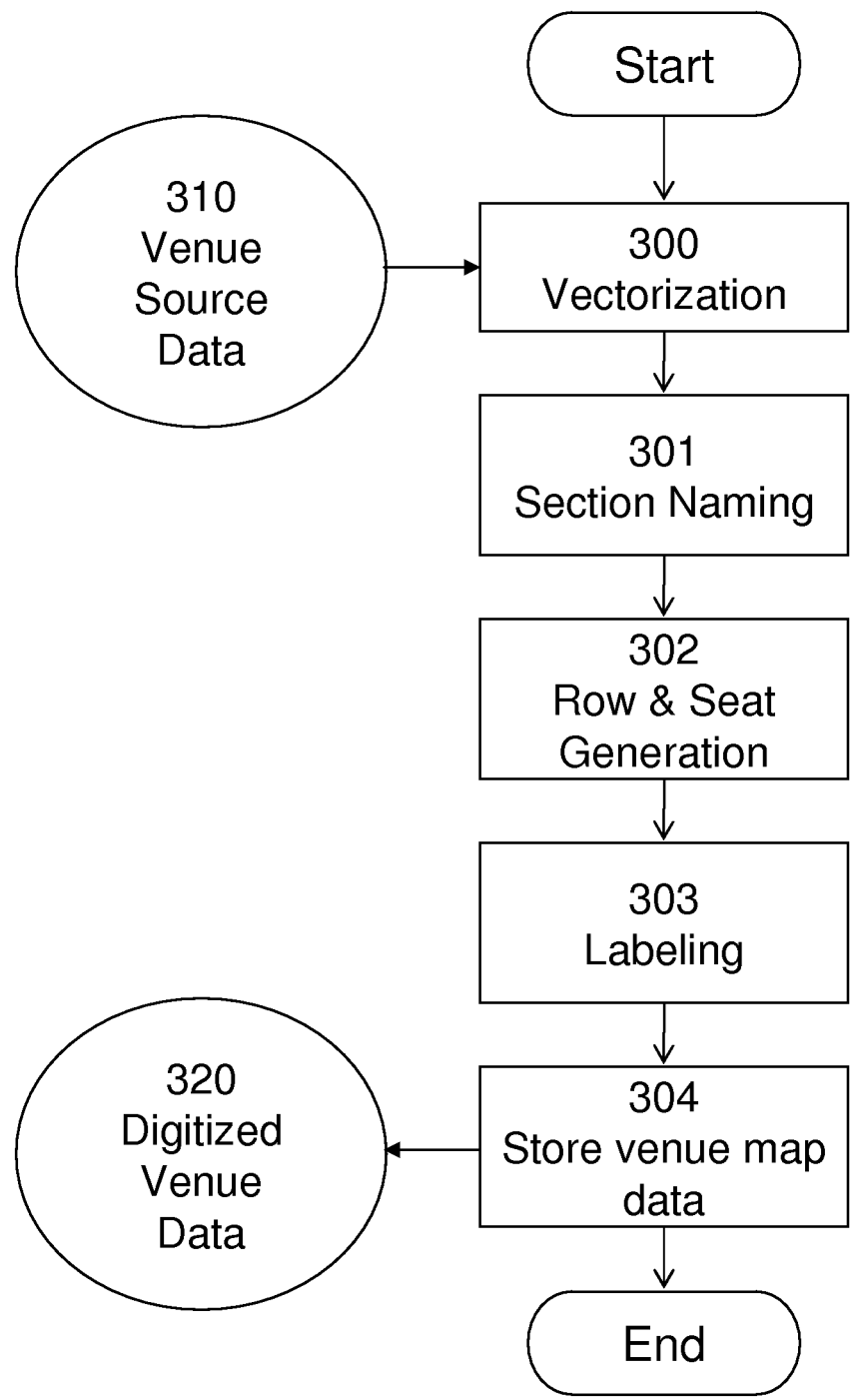
FIG. 3 shows the processing methods to digitize an interactive venue map.
Figure 4:
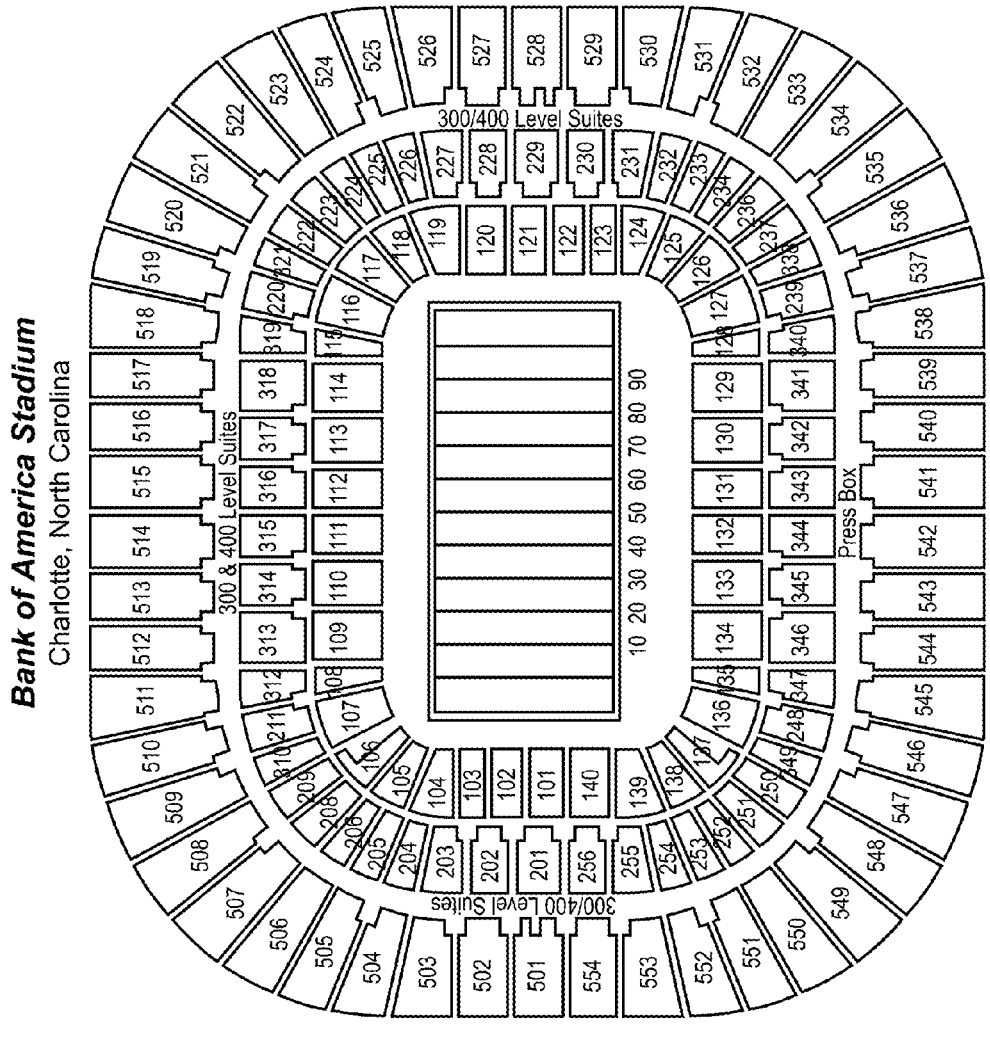
FIG. 4 is an example of venue source data (a map) in bit-mapped format.

FIG. 3 illustrates a methodology or workflow for generating a digital map of a venue; this methodology is typically repeated for each venue to be digitized. The input is the venue source data 310, which includes logical layout information about the venue, such as: a list of sections (by name or other designation), the names of the rows within each section, the number of seats in each row, the seat number of each seat. The venue source data may also include a venue map, which may be in a variety of formats, such as vector-format, bitmap-format, and the like. In some cases, the map may be in bitmap-format optically scanned from a printed map. FIG. 4 is an example of venue source data (a map) in bit-mapped format. The vectorized venue map is stored in the venue database 103.

The output is digitized venue data 320 including a digitized venue map, with a format and detail that enables a user to interactively examine the attributes associated with any individual ticket for a given event at a venue. The digitized venue map may not necessarily be a precise, physically accurate representation of the location of each section, row and seat. For an interactive event ticketing system, extreme precision in the physical details is not always needed—an approximation may be sufficient. Also note that the digitized venue map may only indicate sections and rows, not individual seats, since in the event ticketing industry, it is common practice to provide only section and row information about tickets for sale, and omit specific seat numbers. As such, an interactive venue map may only present the row location of tickets, and not show specific seats.

Processing begins with vectorization stage 300, where a vectorized venue map is generated. Specifically, this stage generates the polygons that define the outline (e.g. bounds, edges, or extent) of each section in the venue, along with the position and orientation of each section within the venue.

If the venue source data includes a map already in vector format, no processing may be needed in stage 300.

If the venue source data is in bitmap format (e.g. an image from a web page, or a scanned image from printed material) that represents or illustrates the venue seating arrangements, the map needs to be vectorized. In one embodiment, the worker can vectorize the map by manually drawing section bounds directly over the bitmap-format map using venue-editing tool 110. In another embodiment, vector generation software tools (such VectorMagic, or the vector generation tool included in Adobe Illustrator) known to those skilled in the art can be used to vectorize the bitmap-format map data.

If the venue source data does not include a map, but only a logical, non-graphic description of the arrangement of the seats, rows, and sections is available, then the vectorized venue map may be built "bottom-up" by generating the section layouts from the information about the seats in each section. This arrangement information can be in the form of a text document, a word processing document, a spreadsheet or the like. This detailed information includes: a list of every section in the venue, the number of rows in each section, the names of all of the rows in the section in order (e.g. front-to-back). In some cases, the detailed information may also include seat information: the number of seats in each row, and the numbers (or names) of each seat. In one embodiment, this detailed information is represented in a spreadsheet file (e.g. Microsoft Excel, Google Documents, etc.). Note that in this case, the venue source data does not include structural information about the physical structure of the venue (whether in actual or scale measurements), such as the actual dimensions or locations of each section, row, or seat.

For this method, the worker creates a new venue map file in a venue editing tool on the workstation. In this file the worker will place individual polygons that represent each section of the venue. Using the venue source data, for a new section, the worker inputs into section generation tool 111 the number of rows in the section, the number of seats in each row, and the alignment of each row within the section, which may be "left", "right" or "center", representing a row that's aligned flush to the left of the section, flush to the right, or centered within the section, respectively. These inputs may be made in depth first (e.g., each section and rows together) order or breadth first order (e.g., all sections, and then all rows), or any combination thereof. The width of a seat is either a default value or specified by the worker. With this alignment information, the system can place each seat in the section and then generate a polygon outline for the section.

The system processes each section in turn, and processes each row in each section. For each section, the system first determines the overall width of the section by identifying the row in that section with the greatest number of seats; this row will have the greatest width, which is then assigned as the width for the section. Then, processing each row in sequence (for example in front-to-back order, moving away from the center of the venue), the system determines a location of the row in the section, aligning it within the overall section width, and relative to its alignment within the section (e.g. left, center, or right). When the final row in the section has been located, the section generation tool 111 generates a polygon outline of the section.

Figure 5A:
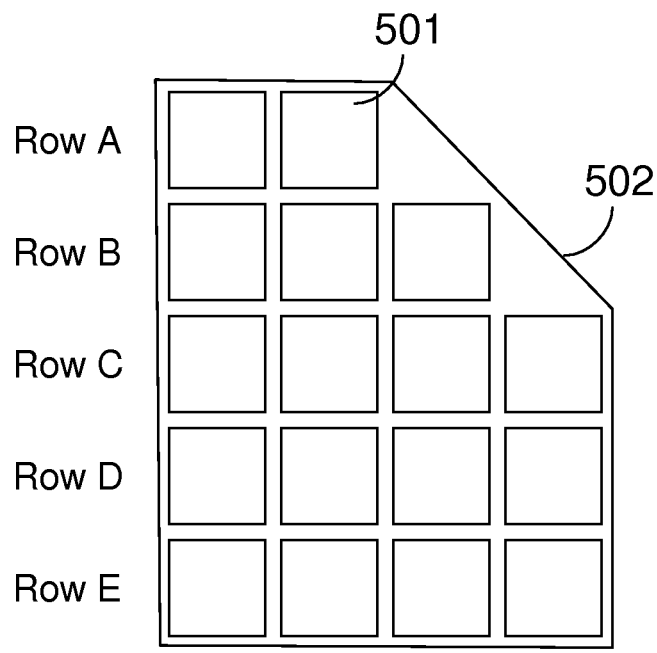
FIG. 5a illustrates methods for venue section layout, showing rows and seats within the section.

FIG. 5a shows an example of a section outline polygon 502 for a section with a number of seats 501. In this example, there are 5 rows: row A has 2 seats, left-aligned, row B has 3 seats left-aligned, and rows C, D, and E each have 4 seats. Note that the specific alignment of C, D, and E is not important in this example, as each of those rows are the maximum width for the section (e.g. 4 seats). Based on this arrangement of rows, the system generates polygon 502 as the representation of the section. This polygon is generated as vector representation, in a vector graphics data format, such as SVG (Scalable Vector Graphics) or Vector Markup Language (VML).

Figure 5B:
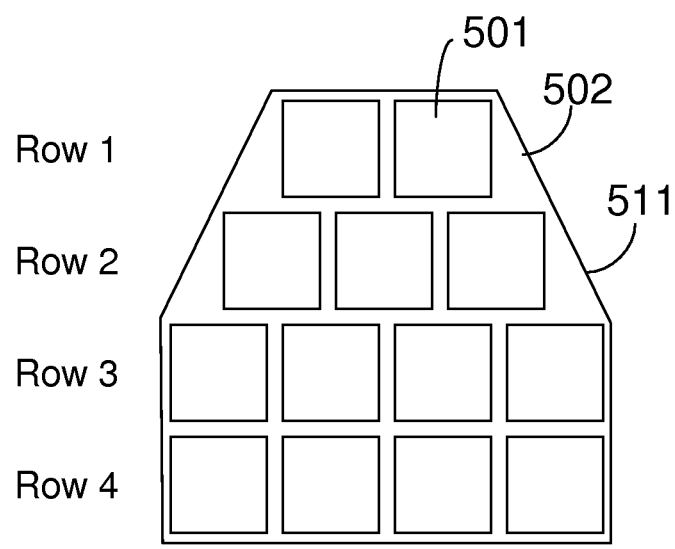
FIG. 5b is another example of a venue section layout, with a different layout.

FIG. 5b shows another example of a section polygon 511. In this example, row 1 has 2 seats, center-aligned. Row 2 has 3 seats, center-aligned, and rows 3 and 4 each have 4 seats. Here, the system generates polygon 502 as the representation of this section based on this arrangement of rows.

Figure 6:
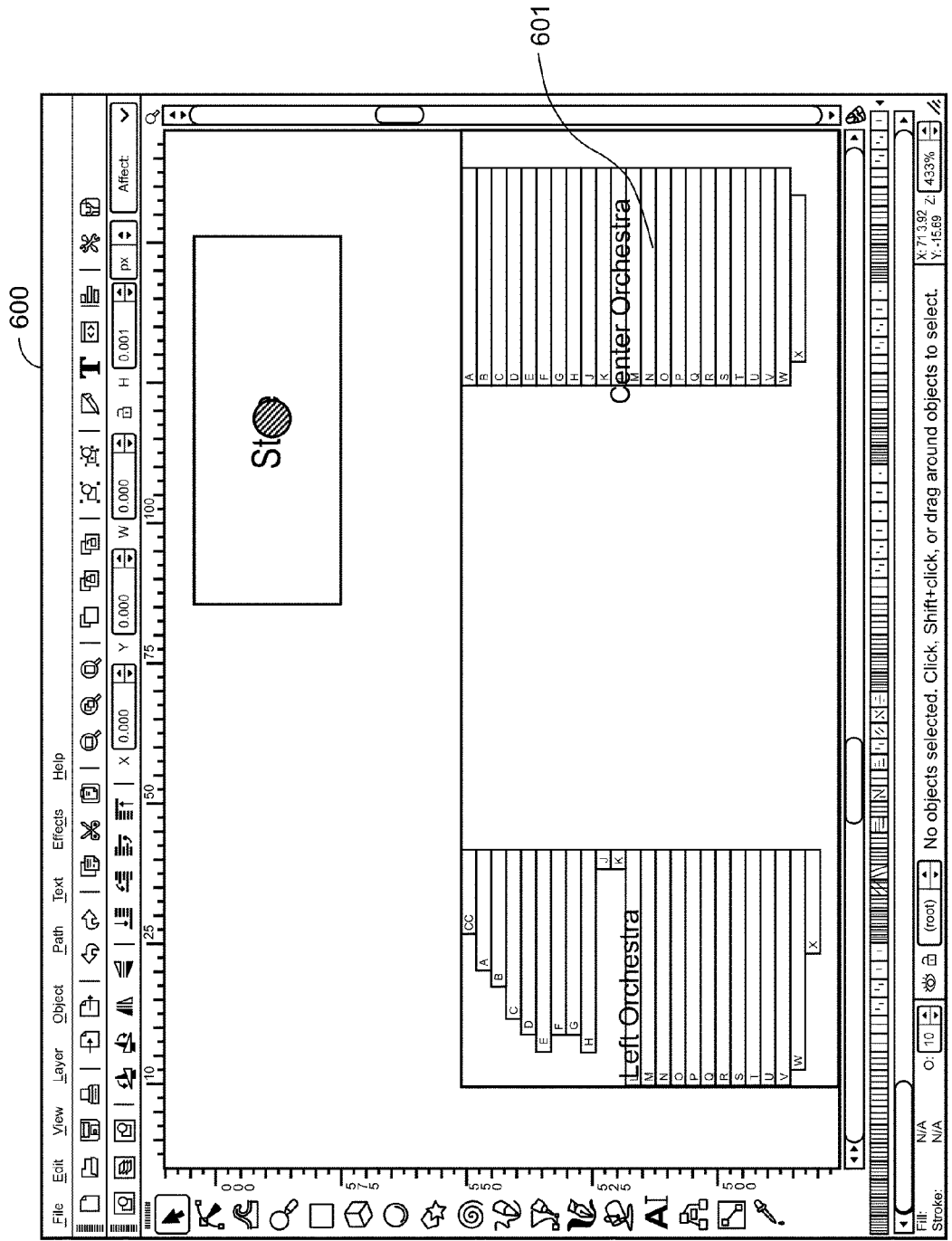
FIG. 6 is an example of a venue-editing tool with some sections placed on the venue map.

After the section outline polygons are generated each section outline in the venue map file is placed at the correct relative location and orientation for that section. In one embodiment, this step is done by the worker using venue editing tool 110, or it can be done algorithmically as part of the vectorization of a bitmap image. FIG. 6 shows an example screen 600 from venue editing tool 110. In this example, section 601 has been placed on the map.

In stage 301, the sections are named. Specifically, a text string representing the section name (e.g. "102", or "Bleachers 36") is associated with each section outline.

In one embodiment, the worker manually names sections using venue-editing tool 110. For map source data originally in bitmap format, this may be the only option available. For embodiments where venue-editing tool 110 is a general purpose CAD or vector-graphics tool (e.g. AutoCAD, Inkscape, Adobe Illustrator, etc.), section naming may be performed by the worker by assigning the section name as an object attribute, for each section outline.

In another embodiment, for venue map source data originally in vector format, sections may be named by automatically finding the nearest text label to the section, and assuming that that label represents the name of the section. (In a vector format, the coordinates of each section polygon, and each text label are specified, thereby allowing various geometric measurements and calculations). One method to find the nearest text label is as follows: first, the centroid (the geometric center) for each section outline and the centriod of each text label in the original map source data is automatically determined from the vector data. Then, for each section, the text label with a centroid closest to the centroid of the section is located. The text from that text label is used as the name of the section; alternatively, the worker can provide a different name. For example, the section label within a vector format file may be "L-ORCH", which stands for "Lower Orchestra;" in this case the worker can select "Lower Orchestra" as the section name, and retain "L-ORCH" as the section label as described below with respect to stage 303. The result of this stage is that each section polygon is associated with one of the text labels in the vector source data.

In stage 302, the system automatically generates the individual row locations (and optionally the seat locations) for each section in the venue, using the vector data. The location of each row is specified by the coordinate locations of the corners of each row. This stage includes selecting a center point of the venue, which represents the "center of attention" (i.e. most seats in the venue would be oriented to view this point). For example, in a baseball park, the venue center point would typically be on or near the pitcher's mound. In a football arena, the venue center point could be the center of the 50-yard line, in the center of the playing field. In one embodiment, the venue center point is specified by the digitization worker during the digitization process (e.g. here in stage 302, or some earlier step), using venue-editing tool 110.

In stage 302, each section in the venue is processed individually. The system first locates the edge of the section outline that represents the "front" of the section. This front edge is generally aligned along the front row of seats in the section. This front edge is determined by choosing the edge, from all edges in the section outline, with a midpoint closest to the venue center point. In a similar manner, the back edge of the section outline is chosen as the edge with a midpoint furthest away from the venue center point.

Figure 7A:
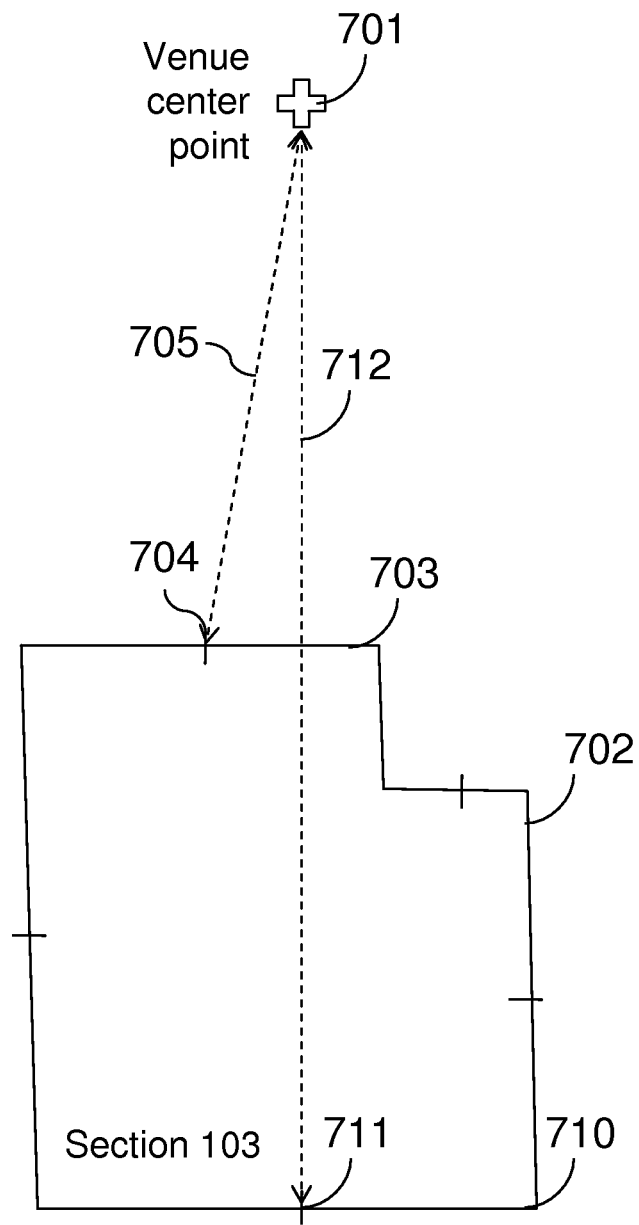
FIG. 7a is a graphic representation of the methods use to determine the front and back edges for a venue section outline.

FIG. 7a illustrates an example of this method. Section outline 702 is a polygon that defines the extents of an example section labeled "Section 103". Of all edges, edge 703 is selected the front edge because midpoint 704 is closest to venue center point 701 (e.g. as measured by distance 705). Similarly, edge 710 is selected as the back edge because midpoint 711 is furthest from venue center point 701 (e.g. as measured by distance 712).

Generally, the front and back edge for a section would be approximately parallel, since the seats in a section are typically arranged in parallel rows. In one embodiment, the system identifies any sections with front and back edges that are not parallel within some specified threshold error margin, e.g., 10 degrees, and then presents those sections to the digitization worker (e.g. with venue-editing tool 110) for confirmation or modification (i.e. the worker can specify different front and/or back edges, overriding the automatic determination). This method automatically detects cases where the system is not able to determine the correct front and back edges.

In another embodiment, the section front and back edges are specified directly by the digitization worker, using venue-editing tool 110. The worker may specify both edges, or only one edge (with the other edge determined automatically using any of the methods previously described).

In another embodiment, the digitization worker specifies one edge (front or back), and the other edge is determined by identifying the edge (of the other edges in the section outline) that is closest to being parallel to the specified edge.

Once the front and back edges are determined, the system determines the location of each row within the section. First, the system calculates the distance between the front and back edges using standard algorithms for distances between lines. If the front and back edges are not exactly parallel, the system may use the distance between the edge midpoints as an approximate distance calculation.

Next, the system automatically divides that front-to-back distance by the number of rows in the section to determine the depth of each row. At each row distance increment from the front to back, the system constructs a line, parallel to the front edge, and bounded (i.e. clipped) by the section outline. These lines define the outlines and locations of each row.

Figure 7B:
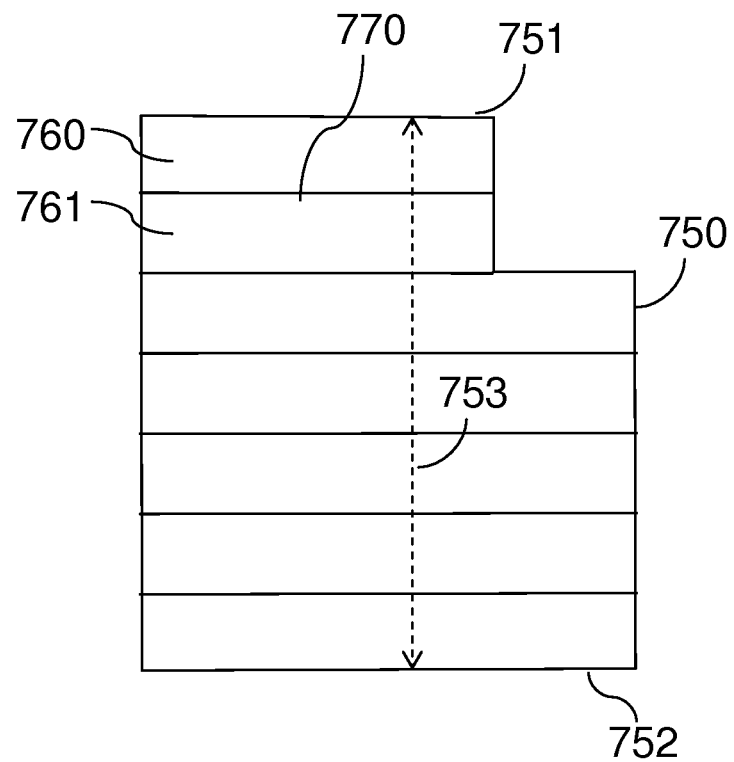
FIG. 7b illustrates the methods for dividing a section into rows.

FIG. 7b illustrates an example of this row allocation method. In this example, section outline 750 has front edge 751 and back edge 752 (determined using any of the previously described methods). Distance 753 is the depth of the section, measured as the distance between the front edge 751 and back edge 752. From the section data, it is known that the section has seven rows. Accordingly distance 753 is divided into 7 portions to define each row: row 760, row 761, etc. Line 770 is constructed as parallel to front edge 751, spaced $1/7^{th}$ of distance 753 away from edge 751, and bounded by section outline 750. This process is repeated for each 1/7<sup>th</sup> distance away from the front edge, until all 6 lines (defining 7 rows) have been constructed.

In one embodiment, the system divides each row into individual seats using a similar method. Given the width of the row, and the number of seats in that row, the system assumes that each seat is the same width evenly allocates the row width across the seats. Thus, the location of each seat is determined within the section, and by extension within the entire venue. Optionally, lines may be drawn separating the seats in each row, where each line is perpendicular to the line for the row, and clipped by the front and rear lines of each row.

In stage 303, the labels for the sections, rows and (optionally) seats are generated and placed on the venue map. As noted above, the section labels can be the same as the section names contained in the venue source data files, or different. In one embodiment, labels are placed for each section, row and seat so the labels are in same relative position and same orientation when viewed from the venue center point. In this method, the section outline (and any corresponding row and seat location information) is rotated so that the front edge is parallel with the x-axis, and the front edge is "down" and the back edge is "up". Section, row and seat labels are then placed in their specified relative locations, with specified alignments. For example, the section label may always be placed in the "upper left" and the row label may be placed "flush left". Then, the section outline, the labels, and any other corresponding information is rotated back to the correct orientation in the venue map, and placed at the correct location in the venue. (Note that the same outcome can be achieved with different ordering of the rotation and placement steps. For example, the labels could be first rotated to match the section outline orientation).

Figure 8:
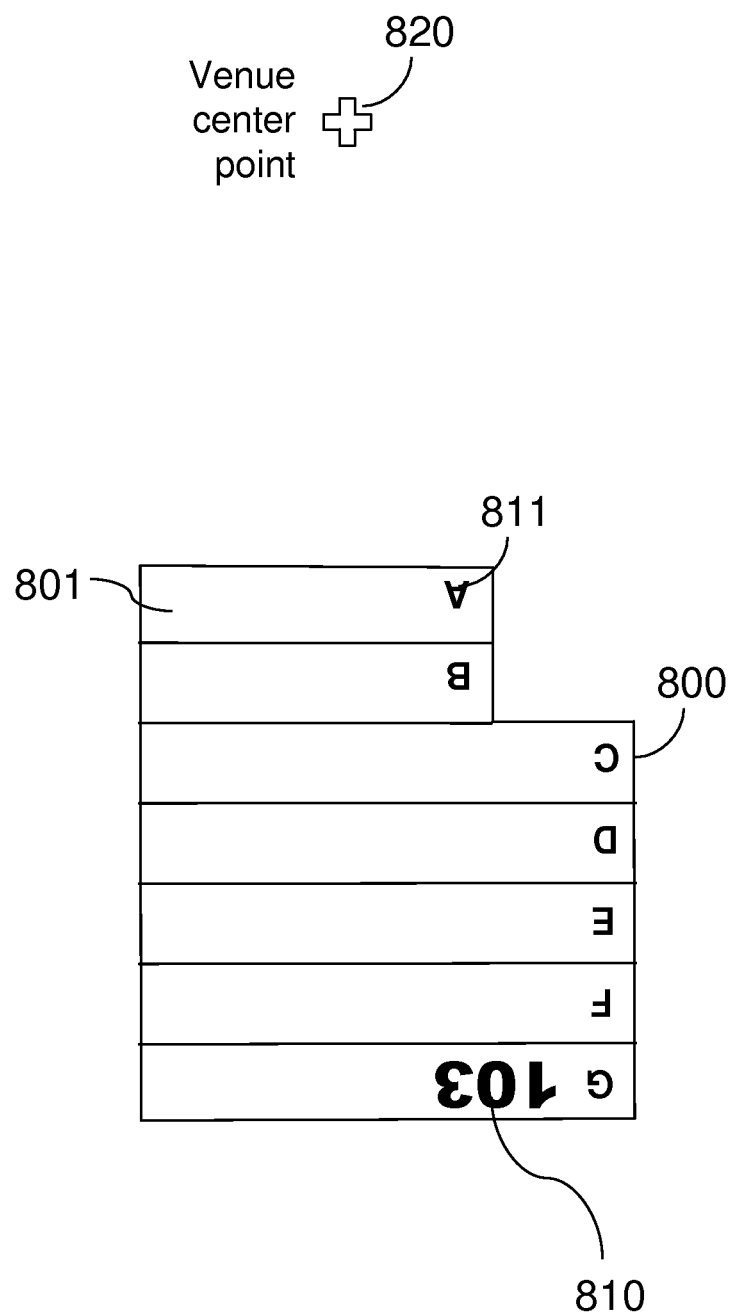
FIG. 8 illustrates the methods for placement of section and row labels in a venue section.

FIG. 8 shows an example of label placement. In this example, section outline 800 has been divided into individual rows (e.g. row 801, etc.). Labels (e.g. row label 811 and section label 810) appear upside down because they have been rotated to appear correctly when viewed from the venue center point 820. In this example, the row labels are configured to be placed flush-left (again, when viewed from the venue center point 820).

In stage 304, all digitized venue map data is stored in venue database 103. This venue map data is a complete representation of the venue data needed to support an interactive venue map (e.g. all labels, section names, section outlines, section locations, row outlines, row names, seat outlines, seat names, etc.) In one embodiment, the venue map data is stored in venue database 103, in a vectorized representation, where outlines are stored as vector data (e.g., coordinate locations of outline segments). The venue map data can also be stored as an SVG (Scalable Vector Graphics) format file.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer assisted method for generating an interactive digitized map of a venue seating arrangement, comprising:
 receiving a data source file with a venue seating arrangement, the venue seating arrangement comprising a plurality of sections, each section having a location in the venue seating arrangement, each section further having at least one row;
 generating from the data source file, a vectorized venue map comprising a plurality of section outlines, each section outline corresponding to a section of the venue seating arrangement, comprising:
  receiving a user input placing a section outline on the vectorized venue map for a section in the data source file;
  receiving a user input of a number of rows in the section;
  receiving a user input of a number of seats in each row in the section;
  receiving a user input of an alignment of each row in the section; and
  generating for the section in data source file, a section outline based on the number of rows, number of seats, and the alignment of each row in the section;
 associating a section label with each section outline in the venue map;
 generating from the data source file, within each section outline, lines indicating the location of the rows within the section;
 placing within the venue map, the section label for each section outline and a row label for each row within a section outline; and
 storing in a computer storage medium the vectorized venue map in a vectorized representation including the section outlines, section labels, and row labels.

2. The method of claim 1, wherein generating from the data source file, a vectorized venue map further comprises:
 for each section in the venue seating arrangement, receiving a user input graphical outline of the section.

3. The method of claim 1, wherein the data source file is a bitmap image of the venue seating arrangement, and generating from the data source file, a vectorized venue map further comprises:
 converting the bitmap image of the venue seating arrangement into a vector graphics file using a vector generation tool.

4. The method of claim 1, wherein generating for the section in the data source file, a section outline comprises:
 determining a width of a widest row in the section;
 determining a location of each row in the section based on its alignment in the section; and
 generating a section outline for the section using the width of the widest row in the section, and the location of each row in the section.

5. The method of claim 1, wherein associating a section label with each section outline in the venue map further comprises:
 receiving a user input of a section label for each section outline; and
 storing each input section label in association with the section outline.

6. The method of claim 1, wherein the data source file is a vector file, and wherein associating a section label with each section outline in the venue map further comprises:
 determining a centroid of a section outline from the data source file;
 determining a text label having a closest centroid to the centroid of the section outline; and
 associating the text label with the closest centroid with the section outline.

7. The method of claim 1, wherein generating from the data source file, within each section outline, lines indicating the location of the rows within the section further comprises for a section outline:
 automatically determining a front edge and a back edge of the section outline relative to a center of attention in the venue;
 automatically determining a distance between the front edge and the back edge;
 automatically allocating the distance between the front edge and the back edge by the number of rows in the section, to determine the location of each line; and
 automatically drawing a line for each row at the determined location, parallel to at least one of the front edge and the back edge, and bounded by the section outline.

8. The method of claim 1, wherein generating from the data source file, within each section outline, lines indicating the location of the rows within the section further comprises for a section outline:
 receiving a user input of a front edge and a back edge of the section outline relative to a center of attention in the venue;
 determining a distance between the front edge and the back edge;
 allocating the distance between the front edge and the back edge by the number of rows in the section, to determine the location of each line; and
 automatically drawing a line for each row at the determined location, parallel to at least one of the front edge and the back edge, and bounded by the section outline.

9. The method of claim 1, wherein placing within the venue map, the section label for each section outline and a row label for each row within a section outline further comprises:
 for each section outline, placing the section label in the section outline in a same relative position and a same relative orientation relative to a venue center point.

10. The method of claim 1, wherein in the data source file each row includes at least one seat, further comprising:
 determining a location of each seat within a row, based on a number of seats in the row and a width of the row.

11. The method of claim 1, wherein storing in a computer storage medium the vectorized venue map in a vectorized representation comprises:
 storing the vectorized venue map in a vector graphics file.

12. The method of claim 1, wherein storing in a computer storage medium the vectorized venue map in a vectorized representation comprises:
 storing the vectorized venue map in a database using vector data.

13. A computer program product, including a non-transitory computer storage medium storing computer program code for controlling a computer system to generate an interactive digitized map of a venue seating arrangement by performing the method comprising:

receiving a data source file with a venue seating arrangement, the venue seating arrangement comprising a plurality of sections, each section having a location in the venue seating arrangement, each section further having at least one row;

generating from the data source file, a vectorized venue map comprising a plurality of section outlines, each section outline corresponding to a section of the venue seating arrangement;

associating a section label with each section outline in the venue map, comprising:
  receiving a user input of a section label for each section outline; and
  storing each input section label in association with the section outline;

generating from the data source file, within each section outline, lines indicating the location of the rows within the section;

placing within the venue map, the section label for each section outline and a row label for each row within a section outline; and storing in a computer storage medium the vectorized venue map in a vectorized representation including the section outlines, section labels, and row labels.

14. A computer system for generating an interactive digitized map of a venue seating arrangement, comprising:
  means for receiving a data source file with a venue seating arrangement, the venue seating arrangement comprising a plurality of sections, each section having a location in the venue seating arrangement, each section further having at least one row;
  means for generating from the data source file, a vectorized venue map comprising a plurality of section outlines, each section outline corresponding to a section of the venue seating arrangement;
  means for associating a section label with each section outline in the venue map by receiving a user input of a section label for each section outline, and storing each input section label in association with the section outline;
  means for generating from the data source file, within each section outline, lines indicating the location of the rows within the section;
  means for placing within the venue map, the section label for each section outline and a row label for each row within a section outline; and
  means for storing in a computer storage medium the vectorized venue map in a vectorized representation including the section outlines, section labels, and row labels.

15. A computer system for generating an interactive digitized map of a venue seating arrangement, comprising:
  a venue editing tool, executable by the computer system, and configured to receive and edit venue map information in a vector graphics format;
  a vectorization tool, executable by the computer system, and configured to receive a bitmap graphics file of a venue seating arrangement, and to generate therefrom a vectorized representation of section outlines of the seating arrangement;
  a section generation tool, executable by the computer system, and configured to generate from a venue source data file containing a logical description of venue seating arrangement, the description comprising a name of each section and a number of rows in each section, a section outline of each section in vector form, a section label for each section, a row outline of each row in each section, and further configured to receive a user input of a section label for each section outline, and store each input section label in association with the section outline; and
  a venue database, executable by the computer system, and configured to store the section outline, section label, and row outline for the sections in a vectorized representation.

16. A computer assisted method for generating an interactive digitized map of a venue seating arrangement, comprising:
  receiving a data source file with a venue seating arrangement, the venue seating arrangement comprising a plurality of sections, each section having a location in the venue seating arrangement, each section further having at least one row;
  generating from the data source file, a vectorized venue map comprising a plurality of section outlines, each section outline corresponding to a section of the venue seating arrangement;
  associating a section label with each section outline in the venue map, comprising:
    receiving a user input of a section label for each section outline; and
    storing each input section label in association with the section outline;
  generating from the data source file, within each section outline, lines indicating the location of the rows within the section;
  placing within the venue map, the section label for each section outline and a row label for each row within a section outline; and
  storing in a computer storage medium the vectorized venue map in a vectorized representation including the section outlines, section labels, and row labels.

17. A computer assisted method for generating an interactive digitized map of a venue seating arrangement, comprising:
  receiving a data source file with a venue seating arrangement, the venue seating arrangement comprising a plurality of sections, each section having a location in the venue seating arrangement, each section further having at least one row;
  generating from the data source file, a vectorized venue map comprising a plurality of section outlines, each section outline corresponding to a section of the venue seating arrangement, wherein the data source file is a vector file;
  associating a section label with each section outline in the venue map, comprising:
    determining a centroid of a section outline from the data source file;
    determining a text label having a closest centroid to the centroid of the section outline; and
    associating the text label with the closest centroid with the section outline;
  generating from the data source file, within each section outline, lines indicating the location of the rows within the section;
  placing within the venue map, the section label for each section outline and a row label for each row within a section outline; and
  storing in a computer storage medium the vectorized venue map in a vectorized representation including the section outlines, section labels, and row labels.

18. A computer assisted method for generating an interactive digitized map of a venue seating arrangement, comprising:

receiving a data source file with a venue seating arrangement, the venue seating arrangement comprising a plurality of sections, each section having a location in the venue seating arrangement, each section further having at least one row;

generating from the data source file, a vectorized venue map comprising a plurality of section outlines, each section outline corresponding to a section of the venue seating arrangement, wherein the data source file is a vector file;

associating a section label with each section outline in the venue map;

generating from the data source file, within each section outline, lines indicating the location of the rows within the section, comprising:
- automatically determining a front edge and a back edge of the section outline relative to a center of attention in the venue;
- automatically determining a distance between the front edge and the back edge;
- automatically allocating the distance between the front edge and the back edge by the number of rows in the section, to determine the location of each line; and
- automatically drawing a line for each row at the determined location, parallel to at least one of the front edge and the back edge, and bounded by the section outline;

placing within the venue map, the section label for each section outline and a row label for each row within a section outline; and storing in a computer storage medium the vectorized venue map in a vectorized representation including the section outlines, section labels, and row labels.

19. A computer assisted method for generating an interactive digitized map of a venue seating arrangement, comprising:

receiving a data source file with a venue seating arrangement, the venue seating arrangement comprising a plurality of sections, each section having a location in the venue seating arrangement, each section further having at least one row;

generating from the data source file, a vectorized venue map comprising a plurality of section outlines, each section outline corresponding to a section of the venue seating arrangement, wherein the data source file is a vector file;

associating a section label with each section outline in the venue map;

generating from the data source file, within each section outline, lines indicating the location of the rows within the section, comprising:
- receiving a user input of a front edge and a back edge of the section outline relative to a center of attention in the venue;
- determining a distance between the front edge and the back edge;
- allocating the distance between the front edge and the back edge by the number of rows in the section, to determine the location of each line; and
- automatically drawing a line for each row at the determined location, parallel to at least one of the front edge and the back edge, and bounded by the section outline;

placing within the venue map, the section label for each section outline and a row label for each row within a section outline; and storing in a computer storage medium the vectorized venue map in a vectorized representation including the section outlines, section labels, and row labels.

20. A computer assisted method for generating an interactive digitized map of a venue seating arrangement, comprising:

receiving a data source file with a venue seating arrangement, the venue seating arrangement comprising a plurality of sections, each section having a location in the venue seating arrangement, each section further having at least one row;

generating from the data source file, a vectorized venue map comprising a plurality of section outlines, each section outline corresponding to a section of the venue seating arrangement, wherein the data source file is a vector file;

associating a section label with each section outline in the venue map;

generating from the data source file, within each section outline, lines indicating the location of the rows within the section;

placing within the venue map, the section label for each section outline and a row label for each row within a section outline, comprising:
- placing the section label in the section outline in a same relative position and a same relative orientation relative to a venue center point; and storing in a computer storage medium the vectorized venue map in a vectorized representation including the section outlines, section labels, and row labels.

* * * * *